A. GIESECKE.
PROCESS OF RECOVERING PROTEIN AND PHOSPHATE OF CALCIUM AND MAGNESIUM FROM ACID WASTE WATERS.
APPLICATION FILED MAR. 10, 1919.
1,354,822.
Patented Oct. 5, 1920.
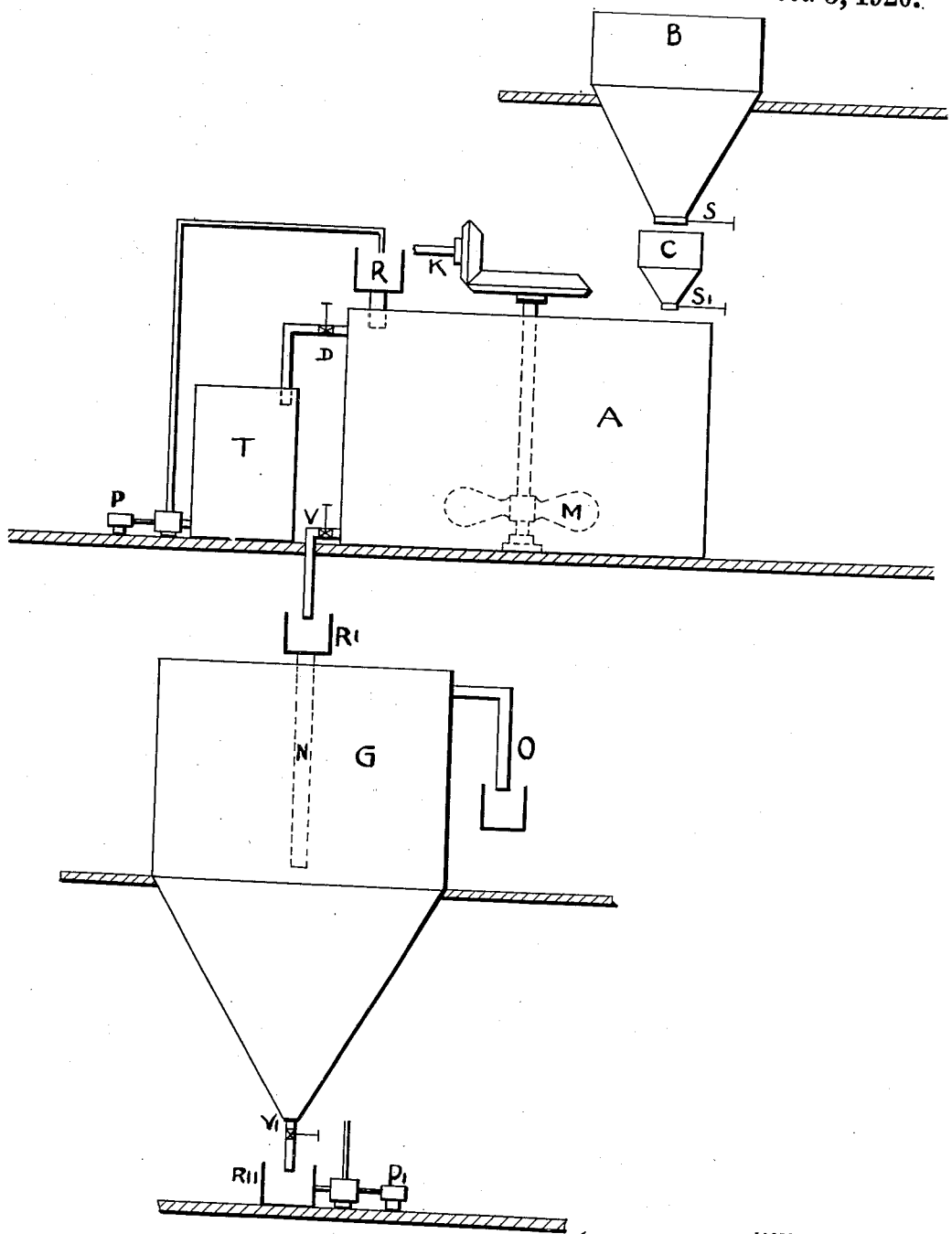

UNITED STATES PATENT OFFICE.

ADOLPH GIESECKE, OF BUFFALO, NEW YORK.

PROCESS OF RECOVERING PROTEIN AND PHOSPHATE OF CALCIUM AND MAGNESIUM FROM ACID WASTE WATERS.

1,354,822.   Specification of Letters Patent.   Patented Oct. 5, 1920.

Application filed March 10, 1919. Serial No. 281,845.

*To all whom it may concern:*

Be it known that I, ADOLPH GIESECKE, a citizen of the United States, residing at Buffalo, in the county of Erie and State of New York, have invented new and useful Improvements in Processes for Recovering Protein and Phosphate of Calcium and Magnesium from Acid Waste Waters, of which the following is a specification.

My invention relates to the recovery of protein and phosphates of calcium and magnesium from corn steep acid waste waters.

The qualitative chemical analysis of these acid waste waters proves the presence of sulfur dioxid, protein, calcium, magnesium, and phosphoric acid. However, this knowledge does not disclose the nature of these waters.

When in these acid waste waters the acidity is determined, calculated as sulfur dioxid, and sodium carbonate added, sufficient to form an acid salt, a combination of protein and phosphate of calcium and magnesium precipitates, while the sulfurous acid, combined with sodium to an acid salt, remains in solution. The precipitation ensues on converting the free sulfurous acid into an acid salt, because that change involves a change in physical properties. An acid salt, with physical properties of its own, is the product of the partial neutralization.

Therefore, these acid waste waters represent simple solutions, wherein the combination of protein and phosphates is the solute and sulfurous acid the solvent. If the solvent is converted into an inactive compound, the solute will precipitate. Moreover, in a sample of the acid waste waters, saturated with chlorin gas, chlorin, decomposing the water, combines with the hydrogen to hydrochloric acid, and the oxygen converts the solvent to sulfuric acid. The oxidation of the solvent involves a change in physical properties. The solute precipitates and that from a solution containing free hydrochloric and sulfuric acid. It is identical with the solute obtained by neutralization of the solvent to an acid salt. In both cases the residue after ignition consists of calcium, magnesium, and phosphoric acid.

The sulfurous acid solution of protein and phosphates of calcium and magnesium originates in the process of steeping corn.

On the large scale, corn is steeped in a solution of sulfurous acid at a temperature of 120 degrees Fahrenheit. The fundamental object of steeping corn in this manner is to break up and remove the intercellular substances which consist of organic and inorganic matter, principally protein and phosphates. The sulfurous acid dissolves the protein and the insoluble phosphates are rendered soluble by chemical decomposition. In the course of steeping a great part of the sulfurous acid oxidizes to sulfuric acid which decomposes the phosphates of calcium and magnesium to soluble compounds. As the removal of these intercellular substances gives room for expansion, corn may rise or swell in the course of steeping to 45 per cent. over its original volume. When the steep is finished, and the steep-liquor drawn off, the kernels retain in their spongy condition a certain part of the steep-liquor, and it is this liquor which contains the protein and phosphates as solute and the sulfurous acid as solvent.

In the subsequent milling and washing operations water in abundance is employed, and that water is of a temperature far below the steeping temperature. The solute precipitates because the solvent has lost its strength both by reduction in temperature and dilution. The precipitation of the solute, solely due to physical changes, brings on a turpidity in the crude starch-milk which, in common parlance, is called a "slimy condition." To relieve the crude starch-milk of this condition, the solvent is strengthened by an additional quantity of sulfurous acid which re-dissolves the solute. Thus, the solute is again in solution, and the refining of starch is thereby facilitated. It is effected by running the crude starch-milk at a certain gravity and proper speed over inclined trough-like planes, called tables. The bulk of starch settles on the tables, and the "tailings" running off at the outlet of the tables, are conducted in wooden trough R to a tank hereinafter described as tank A. The tailings consist of solids, principally starch and glutenous matter, and of acid water which contains the solute and solvent.

I depart here from the customary way. In the process generally practised in starch-plants, the solids of the tailings are separated from the acid water in settlers and worked up into a feed product, known in commerce as gluten-meal. The acid water overflowing the settlers contains the solute and solvent and represents the acid waste water, hereinbefore referred to.

The object of my invention is to produce from the tailings a compound gluten-meal which contains the ingredients of the solids together with the ingredients of the solute, and it consists of the process of neuralizing the free sulfurous acid with sodium carbonate to an acid salt, my invention being based upon the discovery that when the free acid is converted into an acid salt a precipitation is effected and that the product thereby obtained from the acid salt solution consists of a combination of protein and phosphates of calcium and magnesium.

My invention consists, further, of an additional step in the process. It has been found expedient to neutralize the acid with dry sodium carbonate, whereby a complete precipitation is assured.

The accompanying drawing represents a diagrammatic elevation of a suitable apparatus for carrying out my invention.

A represents a neutralizing-tank, wherein the acid of a given volume of tailings is neutralized by sodium carbonate to an acid salt. The sodium carbonate readily dissolves in the water and is thoroughly mixed with the tailings by the agitating action of the propeller-wheel M.

When the tailings in tank A overflow into receiver T the supply is shut off, and as soon as said tailings have reached their lowest level in tank A, valve D is closed. The tailings are now a measured volume, conveniently 3500 gallons.

The accumulated overflow-tailings in receiver T may occasionally be forced back into tank A by pump P.

The acidity of the tailings depends on the gravity at which the crude starch-milk is admitted to the tables. If in the tailings a standard of acidity is once established, it is essential to maintain it. This may be accomplished by aid of frequent determinations. If said tailings show an acid content of 0.64 grams per liter, calculated as sulfur dioxid, 3500 gallons being equal to 13247 liters, contain 18.69 pounds of sulfur dioxid. This definite amount of sulfur dioxid requires a definite amount of sodium carbonate for neutralization. To neutralize 64 pounds of sulfur dioxid in solution with sodium carbonate to an acid salt 53 pounds are required. According to this ratio 18.69 pounds require:—

$$64:53::18.69:x$$
$x=15.48$ pounds of sodium carbonate.

B represents a storage-tank for the sodium carbonate and serves as a supply-tank to measuring-tank C. The quantity of 15.48 pounds of sodium carbonate is measured in tank C, being introduced from tank B by opening a hand-operated slide-gate S. At this juncture the propeller-wheel M, driven from power driven shaft K, is set into motion, and as soon as the tailings in tank A have reached their maximum velocity, the slide-gate $S^1$ is partially opened to allow of a gradual feeding of the sodium carbonate into tank A. When the sodium carbonate is dissolved and the neutralization accomplished, the solute precipitates forthwith and is mixed with the solids of the tailings by agitation.

The protein and phosphates of calcium and magnesium are precipitated from the acid waste water in a state of considerable purity and when mixed with the solids of table-tailings the percentage of protein in the finished compound gluten-meal is thereby advanced. Furthermore, it has been found by quantitative chemical analysis that the percentage of phosphates in the common gluten-meal has been reduced by the preceding chemical and physical operations in the process of making starch, below the average amount of phosphates contained in the corn. This lack of phosphates is supplied by mixing the precipitated solute with the solids of table-tailings.

The subsequent process of making from the solids in tank A a marketable compound gluten-meal is identical with the process of working up the solids of the tailings into common gluten-meal.

The mixture of solids and water in tank A is conducted, by opening valve V, to wooden trough $R^1$, from thence through pipe N into settler G. The solids of the mixture, being heavier than water, accumulate in the cone and pass out with water in a physically condensed state, the flow of which is regulated by valve $V^1$. The water rises by continuous feeding and flows off through pipe O. The mixture of condensed solids and water is forced from wooden trough $R^{11}$ by pump $P^1$, through filter-presses, the press-cake reduced to dryness and ground to a meal.

I claim as my invention:

1. The precipitation of a combination of protein and phosphates of calcium and magnesium from corn steep acid waste waters by partially neutralizing the solvent.

2. The precipitation of a combination of protein and phosphates of calcium and magnesium from corn steep acid waste waters by partially neutralizing the solvent with dry sodium carbonate.

3. The precipitation of a combination of protein and phosphates of calcium and magnesium from corn steep acid waste waters by partially neutralizing the solvent with dry sodium carbonate and the mixing of the precipitate with the solids of table-tailings to a compound gluten-meal by agitation.

ADOLPH GIESECKE.